United States Patent Office 3,772,330
Patented Nov. 13, 1973

1

3,772,330
2-PHENYLAMINO-$\Delta^1$-PYRROLINES

Edgar Enders, Cologne, and Wilhelm Stendel, Wuppertal-Elberfeld, Germany, assignors to Bayer Aktiengesellschaft, Leverkusen, Germany No Drawing. Filed Oct. 16, 1970, Ser. No. 81,514
Claims priority, application Germany, Oct. 23, 1969, P 19 53 344.9
Int. Cl. C07d *27/14*
U.S. Cl. 260—326.9 7 Claims

ABSTRACT OF THE DISCLOSURE 2-phenylamino-$\Delta^1$-pyrrolines, i.e. 2-(di-substituted phenyl-alkyl or alkenylamino)-$\Delta^1$-pyrrolines wherein the alkyl or alkenyl group contains up to eight carbon atoms and one of the two substituents on the phenyl ring is halogen and the other halogen or lower alkyl, one of the two being in 4-position, and their salts, which possess parasiticidal properties, especially animal acarid ectoparasiticidal properties, and processes for their preparation.

The present invention relates to and has for its objects the provision of particular new 2-phenylamino-$\Delta^1$-pyrrolines, i.e. 2-(di-substituted phenyl-alkyl or alkenylamino)-$\Delta^1$-pyrrolines wherein the alkyl or alkenyl group contains up to eight carbon atoms and one of the two substituents on the phenyl ring is halogen and the other halogen or lower alkyl, one of the two being in 4-position, and their salts, which possess parasiticidal, especially animal acarid ectoparasiticidal properties, active compositions in the form of mixtures of such compounds with solid and liquid dispersible carrier vehicles, and methods for producing such compounds and for using such compounds in a new way especially for combating pests, e.g. parasites, especially animal acarid ectoparasites, with other and further objects becoming apparent from a study of the within specification and accompanying examples.

It is known from French patent specification 1,504,840 that certain arylamidines, such as N-(3,4-dichlorophenyl)-N'-dimethylacetamidine, are suitable for the control of acarids.

The present invention provides 2-phenylamino-$\Delta^1$-pyrrolines of the formula

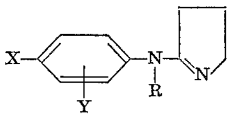

(I)

in which

X and Y each stands independently for a halogen atom or lower alkyl, provided that at least one of these radicals is a halogen atom, and R stands for alkyl or alkenyl with up to 8 carbon atoms, and their salts.

The compounds of the present invention exhibit strong acaricidal properties and can be used for the control of animal ectoparasites from the class of the acarids. The compounds are also active against plant-damaging mites.

The present invention also provides a process for the production of the 2-phenylamino-$\Delta^1$-pyrrolines in which an N-alkylaniline of the formula

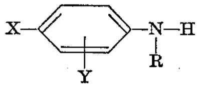

(II)

2 in which X, Y and R have the meanings stated above, is condensed with pyrrolidone-(2) of the formula

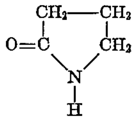

(III)

in the presence of an agent which splits off water, and, optionally, the resulting 2-phenylamino-$\Delta^1$-pyrroline is converted into any desired salt thereof.

The 2-phenylamino-$\Delta^1$-pyrrolines are obtained as free bases or in the form of their hydrogen halide salts, according to the reaction conditions employed in the condensation of the N-alkyl-aniline and pyrrolidone-(2).

The salts of the 2-phenylamino-$\Delta^1$-pyrrolines include the acid addition salts.

Surprisingly, the 2-phenylamino-$\Delta^1$-pyrrolines according to the present invention possess a better acaricidal activity than the arylamidines known from the prior art. The compounds according to the invention therefore represent an enrichment of the art.

If N-butyl-3,4-dichloroaniline and pyrrolidone-(2) are used as starting materials, in the presence of phosphorus oxychloride, the reaction course can be represented by the following equation:

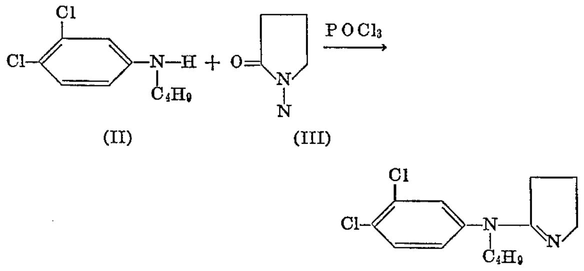

(II) (III)

(I)

The anilines used as starting materials are known and are defined by the Formula II stated above. In this formula, as in Formula I, X and Y are preferably chlorine, bromine, fluorine or alkyl having up to 4 carbon atoms, especially methyl or ethyl. R stands preferably for alkyl or alkenyl with up to 6 carbon atoms.

Aniline derivatives suitable for the synthesis of the active compounds are, for example:

N-methyl-3,4-dichloroaniline,
N-ethyl-3,4-dichloroaniline,
N-propyl-3,4-dichloroaniline,
N-butyl-3,4-dichloroaniline,
N-isobutyl-3,4-dichloroaniline,
N-hexyl-3,4-dichloroaniline,
N-allyl-3,4-dichloroaniline,
N-crotyl-3,4-dichloroaniline,
N-methallyl-3,4-dichloroaniline, and the like, as well as the appropriate N-alkyl and N-alkenyl derivates of the following aromatic amines:

2,4-dichloro-aniline,
3-bromo-4-chloro-aniline,
2,4-dibromo-aniline,
4-bromo-3-chloro-aniline,
2-bromo-4-chloro-aniline,
4-bromo-2-chloro-aniline,
4-fluoro-3-bromo-aniline,
4-fluoro-2-chloro-aniline,
4-chloro-2-methyl-aniline,
4-bromo-2-methyl-aniline,
4-chloro-2-ethylaniline,
4-bromo-2-ethyl-aniline,
4-chloro-3-methyl-aniline, 4-bromo-3-methyl-aniline,
4-methyl-3-chloro-aniline,
4-methyl-3-bromo-aniline, and the like.

The pyrrolidone-(2) used as a starting material is known and is defined by the Formula III stated above.

The reaction may be carried out in the presence of an inert diluent which term herein includes a solvent. Suitable solvents are aromatic hydrocarbons, such as benzene, toluene and xylene; chlorinated hydrocarbons, such as chlorobenzene, dichlorobenzenes and tetrachloroethylene. Advantageously, however, pyrrolidone-(2) is used in excess, and then serves as a reactant and, at the same time, as a solvent.

As agents which split off water, preferably inorganic acid halides are used, such as phosphorus oxychloride, thiophosphoryl chloride, phosphorus trichloride, thionyl chloride, phosgene, silicon tetrachloride and tin tetrachloride.

The reaction temperatures can be varied within a fairly wide range. In general, the work is carried out at from about 20° to 120° C., preferably from about 40° to 100° C.

Generally, when preparing the active compounds, all the reactants are first mixed, and not until then (if such is required) is the reaction mixture heated to elevated temperatures, for example, about 70° to 100° C. The reaction, as normally carried out, is complete when the evolution of hydrogen halide has ceased.

The 2-phenylamino-$\Delta^1$-pyrrolines are usually obtained as hydrogen halide salts which are sparingly soluble in organic solvents. They can be isolated as such. For purification, the free bases can be liberated by treatment with a strong base or alkali, such as an aqueous solution of sodium hydroxide, or an aqueous solution of potassium hydroxide, and then distilled. The free bases can, for the preparation of any desired salts, be reacted with the appropriate acids, for example, with sulphuric acid, phosphoric acid, nitric acid or acetic acid.

The free bases, like the salts, exhibit strong acaricidal activity, particularly against acarids which, as animal ectoparasites, infest domesticated animals, such as cattle, sheep and rabbits. At the same time, the pyrrolidines have only a slight toxicity to warm-blooded animals. They are therefore well suited for the control of animal ectoparasites from the Order of the acarids.

As economically important ectoparasites of this Order, from the Family of the Ixodidae, which play a large part in tropical, subtropical and temperate latitudes, there are mentioned for example:

The Australian and South American one-host cattle tick *Boophilus microplus*, the Central and North American one-host cattle tick *Boophilus annulatus*, the African one-host cattle tick *Boophilus decoloratus*; further, the African multi-host cattle and sheep ticks *Rhipicephalus evertsi, Rhipicephalus appendiculatus, Rhipicephalus simus, Amblyomma hebraeum, Hyalomma truncatum*, and the like.

In the same manner, there can also be controlled: representatives from the Family *Sarcoptidae*, such as the sheep sucking-mite (*Psoroptes ovis*), the rabbit sucking-mite (*Psoroptes cuniculi*) and representatives from the Family *Dermanyssidae*, such as the red bird-mite (*Dermanyssus gallinae*), and the like. In the course of time, ticks in particular have become resistant to the phosphoric acid esters and carbamates used hitherto as control agents, so that the success of control in many areas is, to a growing extent, rendered questionable. To safeguard economic livestock husbandry in the infestation areas, there exists an urgent need for agents with which pests of all development stages, that is to say larvae, nymphs, metanymphs and adults, including those of resistant strains, for example of the genus Boophilus, can be controlled with certainty. For example, in Australia the Ridgeland strain and the Biarra strain of *Boophilus microplus* are, to a great extent, resistant against the phosphoric acid ester agents used hitherto.

The active compounds according to the invention are equally effective both against the normally sensitive and against the resistant strains, for example, of Boophilus. In customary methods of application to the host animal, they act in a strong ovicidal manner on the adult forms, so that the propagation cycle of the ticks is interrupted in the non-parasitic phase. The production of eggs is largely prevented and the development and the hatching inhibited.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, such as O-dichlorobenzene, trichlorobenzene, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), pyrrolidones (e.g. N-methylpyrrolidone-2), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic and/or cationic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, quaternary ammonium salts of longer, e.g. $C_{6-20}$, alkyl radicals, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially hygiene control or disinfectant agents, such as other parasiticides, or acaricides, insecticides, fungicides, bactericides, etc., if desired, or in the form of particular dosage preparations for specific application made therefrom, such as solutions, emulsions, suspensions, powders, pastes, and granules, which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or animal, e.g. livestock, application generally contemplate those in which the active compound is present in an amount substantially between about 0.001–5%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, and preferably 0.01–95%, by weight of the mixture.

It will be appreciated that the application concentrations are produced in connection with the above noted formulations normally by dilution with water. Furthermore, such concentrations can, according to the application form, be varied within a fairly wide range and are generally substantially between about 10 to 50,000 p.p.m. (g./g.), preferably between about 100 to 10,000 p.p.m., i.e. 0.001–5%, preferably 0.01–1%, as aforesaid.

Advantageously, the aqueous solutions or emulsions of the instant activee compounds possess a markedly good stability under practical conditions, so that, even after standing for long periods at a pH in the range of from 7–9, such compounds may remain effective, i.e. even for three months or longer.

In particular, the present invention contemplates methods of selectively killing, combating or controlling pests, e.g. parasites, i.e. animal acarid ectoparasites, which comprises applying to at least one of correspondingly (a) such animal acarid ectoparasites, and (b) the corresponding habitat, i.e. the locus to be protected, e.g. the animal or livestock, a correspondingly combative or toxic amount, i.e. animal acarid ectoparasiticidally effective amount of the particular active compound of the invention alone or together with a carrier vehicle as noted above. The instant formulations or compositions are applied in the usual manner, for instance by spraying, atomizing, scattering, dusting, watering, i.e. as a bath (dip), sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

In-vitro test for ovicidal effect on ticks

The determination of the ovicidal effect on ticks (inhibition of egg production) takes place in vitro in the following experimental procedure;

3 g. of active compound are mixed with 7 g. of a mixture of equal parts by weight of ethyleneglycol monomethyl ether and nonylphenyl polyglycol ether. The emulsion concentrate so obtained is diluted with water to the application concentration desired in each case.

Adult, engorged female ticks of the species *Boophilus microplus* (resistant) are immersed for one minute in this preparation of active compound. After immersion of, in each case, 10 female specimens of the various strains of ticks, the individual ticks are transferred into plastics dishes, the bottoms of which are each covered with a filter paper disc.

After 35 days, the effectiveness of the preparation of active compound is determined by ascertaining the inhibition of the production of fertile eggs compared with the egg production of untreated control ticks. The effect is stated as a percentage, 100% meaning that fertile eggs ceased to be laid, and 0% meaning that the ticks have laid eggs in a normal manner as displaced by the untreated control ticks.

The results obtained are in the following Table 1:

TABLE 1.—IN-VITRO TEST FOR OVICIDAL EFFECT ON TICKS

| Active compound | Ovicidal effect against Boophilus (Biarra strain)—Inhibition with the stated concentration of— 100% | 50% |
|---|---|---|
| (A)--- 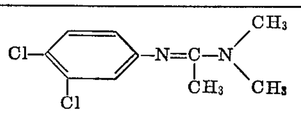 (known) | ----------- | 1.0 |
| (2)--- 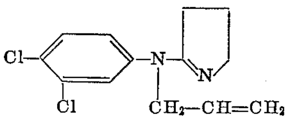 | 1.0 | 0.3 |
| (1)--- 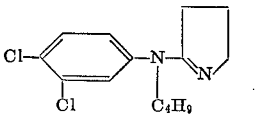 | 0.3 | 0.2 |
| (3)--- 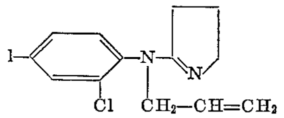 | 0.03 | 0.02 |
| (4)--- 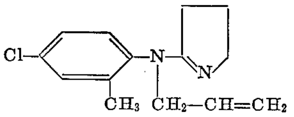 | 0.1 | 0.05 |

The following example illustrates the process of the invention for producing the novel compounds.

EXAMPLE 2

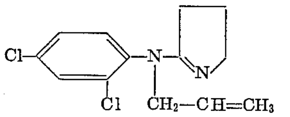

(3)

47 g. of phosphorus oxychloride are added dropwise to 50 g. of N-allyl-2,4-dichloroaniline and 200 g. of pyrrolidone-(2). The temperature of the reaction mixture is allowed to rise to 80° C. and is then kept at 80° C. for 30 minutes; thereupon, pouring into ice water and excess solution of sodium hydroxide is effected. The oily reaction product is then taken up in benzene; the benzene solution is dried over potassium carbonate and fractionally distilled. The boiling point of the 2-(2,4-dichlorophenyl-allyl-amino)-$\Delta^1$-pyrroline is 135°–140° C. under a pressure of 0.5 mm. Hg. The yield is 45 g.

In an analogous manner, there can be prepared:

| | |
|---|---|
| (2).. 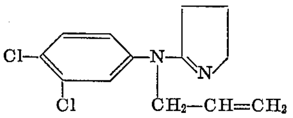 | B.P. 140–145° C./0.7 mm. Hg |
| (1).. 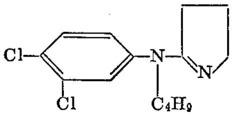 | B.P. 152–159° C./0.5 mm. Hg. |
| (4).. 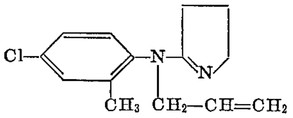 | B.P. 130–135° C./0.5 mm. Hg. |

It will be realized that all of the foregoing compounds contemplated by the present invention possess the desired selective pesticidal, especially parasiticidal, i.e. animal acarid ectoparasiticidal, properties for combating parasites, especially animal acarid ectoparasites, and that such compounds have only a very slight toxicity toward warm-blooded creatures.

It will be appreciated that the instant specification and examples are set forth by way of illustration and not limitation, and that various modifications and changes may be made without departing from the spirit and scope of the present invention.

What is claimed is:

1. A 2-phenylamino-$\Delta^1$-pyrroline of the formula

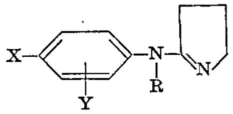

(I)

in which

X and Y each stands independently for a halogen atom or lower alkyl, provided that at least one of these radicals is a halogen atom, and R stands for alkyl or alkenyl with up to 8 carbon atoms, and or a salt thereof.

2. A compound according to claim 1 in which X and Y are chlorine, bromine, fluorine, methyl or ethyl radicals, and R stands for alkyl or alkenyl with up to 6 carbon atoms.

3. A compound according to claim 1 which is the salt of sulphuric acid, phosphoric acid, nitric acid, acetic acid or a hydrohalic acid.

4. A compound according to claim 1 wherein such compound is 2-(2,4-dichlorophenyl-allylamino)-$\Delta^1$-pyrroline of the formula

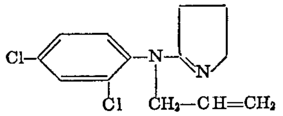

(3)

or a salt thereof.

5. A compound according to claim 1 wherein such compound is 2-(3,4-dichlorophenyl-allylamino)-$\Delta^1$-pyrroline of the formula

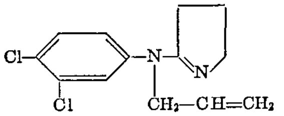

(2)

or a salt thereof.

6. A compound according to claim 1 wherein such compound is 2-(3,4-dichlorophenyl-n-butylamino)-$\Delta^1$-pyrroline of the formula

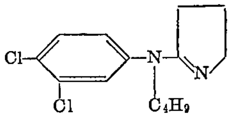

(1)

or a salt thereof.

7. A compound according to claim 1 wherein such compound is 2-(2-methyl-4-chlorophenyl-allylamino)-$\Delta^1$-pyrroline of the formula

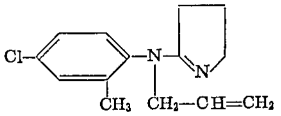

(4)

or a salt thereof.

References Cited

UNITED STATES PATENTS 3,109,848 11/1963 Bortnick et al. ---- 260—326.9 X

OTHER REFERENCES

Brederick et al. Chem. Abs. vol. 55, 27372 (1961).

JOSEPH A. NARCAVAGE, Primary Examiner

U.S. Cl. X.R.

424—274

UNITED STATES PATENT OFFICE
CERTIFICATE OF CORRECTION

Patent No. 3,772,330 Dated November 13, 1973

Inventor(s) EDGAR ENDERS, ET. AL.

It is certified that error appears in the above-identified patent and that said Letters Patent are hereby corrected as shown below:

Column 2, line 31, in the formula change "N"
|
N to -- N -- . Column 5, line 25, correct the spelling of
|
H "active"

Signed and sealed this 6th day of August 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.